United States Patent
Chanclou et al.

(10) Patent No.: US 12,028,115 B2
(45) Date of Patent: Jul. 2, 2024

(54) COHERENT DETECTION WITH OPTIMISED LOCAL OSCILLATOR

(71) Applicant: Orange, Issy-les-Moulineaux (FR)

(72) Inventors: Philippe Chanclou, Chatillon (FR); Gaël Simon, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 197 days.

(21) Appl. No.: 17/620,457

(22) PCT Filed: May 27, 2020

(86) PCT No.: PCT/EP2020/064704
§ 371 (c)(1),
(2) Date: Dec. 17, 2021

(87) PCT Pub. No.: WO2020/254080
PCT Pub. Date: Dec. 24, 2020

(65) Prior Publication Data
US 2022/0271844 A1    Aug. 25, 2022

(30) Foreign Application Priority Data

Jun. 21, 2019  (FR) .................................. 1906714
Nov. 29, 2019  (FR) .................................. 1913462

(51) Int. Cl.
*H04B 10/63* (2013.01)
*H04B 10/079* (2013.01)
*H04B 10/61* (2013.01)

(52) U.S. Cl.
CPC ... *H04B 10/6162* (2013.01); *H04B 10/07953* (2013.01); *H04B 10/616* (2013.01); *H04B 10/63* (2013.01)

(58) Field of Classification Search
CPC .......... H04B 10/6162; H04B 10/07953; H04B 10/616; H04B 10/63; H04B 10/615; H04B 10/612
See application file for complete search history.

(56) References Cited

U.S. PATENT DOCUMENTS

| | | | | |
|---|---|---|---|---|
| 7,894,728 B1* | 2/2011 | Sun | ....................... | H04L 7/0004 398/208 |
| 2002/0042802 A1* | 4/2002 | Mogi | ..................... | H03H 17/06 708/319 |

(Continued)

FOREIGN PATENT DOCUMENTS

| | | | | |
|---|---|---|---|---|
| CN | 112532319 A | * | 3/2021 | ........... H04B 10/504 |
| CN | 114448518 A | * | 5/2022 | |

(Continued)

OTHER PUBLICATIONS

Proximity. (2016). In Editors of the American Heritage Dictionaries (Ed.), The American Heritage(R) Dictionary of the English Language. Houghton Mifflin. Retrieved Sep. 22, 2023, from https://search.credoreference.com/articles/Qm9va0FydGljbGU6NDQ0ODIwMQ==.*

(Continued)

*Primary Examiner* — Tanya T Motsinger
(74) *Attorney, Agent, or Firm* — David D. Brush; Westman, Champlin & Koehler, P.A.

(57) ABSTRACT

A device for coherent detection of data transported in an optical incoming useful signal. The device includes: a first incoming single-mode optical fibre, injecting the incoming useful signal; a second incoming single-mode optical fibre, injecting an optical signal of optical frequency substantially equal to that of the incoming useful signal, referred to as an oscillation signal, a signal mixer in which one of the signals from the first or second fibre is separated into two signals having orthogonal polarisations, and where the other one of (Continued)

the signals from the first or second fibre is mixed with the two separate signals, producing a mixed signal; a detector of the transported data present in the mixed signal; and an amplitude modulator configured to modulate the oscillation signal before it enters the mixer, the modulation pattern having repetitive pulses of the same interval as a symbol time of the incoming useful signal.

12 Claims, 4 Drawing Sheets

(56) References Cited

U.S. PATENT DOCUMENTS

| | | | | |
|---|---|---|---|---|
| 2002/0126784 | A1* | 9/2002 | Brazeau | H04L 7/02 375/371 |
| 2003/0067972 | A1* | 4/2003 | Peeters | H04L 25/03038 375/222 |
| 2004/0037560 | A1* | 2/2004 | Mells | H04B 10/25751 398/91 |
| 2008/0292326 | A1* | 11/2008 | Ferrero | H04B 10/60 398/213 |
| 2012/0121274 | A1* | 5/2012 | Fludger | H04B 10/614 398/208 |
| 2012/0141138 | A1* | 6/2012 | Yang | H04L 27/2634 398/140 |
| 2014/0376929 | A1* | 12/2014 | Takechi | H04B 10/614 398/212 |
| 2016/0181979 | A1* | 6/2016 | Taylor | H04B 10/63 327/291 |
| 2016/0182155 | A1* | 6/2016 | Taylor | H01L 29/74 398/208 |
| 2016/0261352 | A1* | 9/2016 | Wen | H04B 10/5053 |
| 2017/0026134 | A1* | 1/2017 | Ciaramella | H04B 10/6166 |
| 2017/0115455 | A1* | 4/2017 | Slotwinski | G02B 6/29346 |
| 2017/0257173 | A1* | 9/2017 | Harris | H04B 10/07953 |
| 2018/0006799 | A1* | 1/2018 | Yadav | H04B 10/69 |
| 2020/0186258 | A1* | 6/2020 | Brown | H04B 10/11 |
| 2021/0167864 | A1* | 6/2021 | Razzell | H04B 10/25133 |
| 2022/0236140 | A1* | 7/2022 | Hui | G01M 11/3181 |

FOREIGN PATENT DOCUMENTS

| | | | | |
|---|---|---|---|---|
| EP | 0194786 | A2 | 9/1986 | |
| EP | 2026478 | A1 * | 2/2009 | H04B 10/60 |
| EP | 2026478 | A1 | 2/2009 | |
| WO | 2005027378 | A1 | 3/2005 | |
| WO | WO-2005027378 | A1 * | 3/2005 | H04B 10/60 |
| WO | 2015079400 | A1 | 6/2015 | |
| WO | WO-2015079400 | A1 * | 6/2015 | H04B 10/611 |
| WO | 2019117761 | A1 | 6/2019 | |

OTHER PUBLICATIONS

Limit. (2016). In Editors of the American Heritage Dictionaries (Ed.), The American Heritage(R) Dictionary of the English Language. Houghton Mifflin. Retrieved Sep. 29, 2023, from https://search.credoreference.com/articles/Qm9va0FydGljbGU6NDQyOTQzNw==.*

Ciaramella Ernesto, "Polarization-Independent Receivers for Low-Cost Coherent OOK Systems", Mar. 1, 2014 (Mar. 1, 2014), vol. 26, No. 6, p. 548-551, XP011540387.

Sezer Erkilinc M et al, "Comparison of Low Complexity Coherent Receivers for UDWDM-PONs (λ-to-the-user)", arxiv.org, Cornell University Library, 201 Olin Library Cornell University Ithaca, NY 14853, Nov. 2, 2017 (Nov. 2, 2017), XP080834793.

English translation of the Written Opinion of the International Searching Authority dated Jun. 29, 2020 for corresponding International Application No. PCT/EP2020/064704, filed May 27, 2020.

International Search Report dated Jun. 18, 2020 for corresponding International Application No. PCT/EP2020/064704, dated May 27, 2020.

Written Opinion of the International Searching Authority dated Jun. 18, 2020 for corresponding International Application No. PCT/EP2020/064704, filed May 27, 2020.

* cited by examiner

COHERENT DETECTION WITH OPTIMISED LOCAL OSCILLATOR

CROSS-REFERENCE TO RELATED APPLICATIONS

This Application is a Section 371 National Stage Application of International Application No. PCT/EP2020/064704, filed May 27, 2020, which is incorporated by reference in its entirety and published as WO 2020/254080 A1 on Dec. 24, 2020, not in English.

1. FIELD OF THE INVENTION

The invention relates to the field of telecommunications via optical fibers, and more particularly to that of optical-signal receivers, such as for example optical line terminals (OLT) or optical network terminals (ONT) used in passive optical networks (PON).

2. PRIOR ART

One of the great difficulties in the detection, reception-end, of data conveyed in an optical signal, also called the payload signal, results from attenuation of this signal during its journey through the optical medium. One technique used consists, on the arrival of the signal, in multiplying the optical signal by another optical signal of similar frequency (called the oscillation signal). This multiplication of optical signals is effective only if the two optical signals are on the same polarization axis. It is thus necessary to limit the effect due to the continual variation in the optical state of polarization of the optical signal propagating through the fiber, with respect to the state of polarization of the optical oscillator, which, for its part, remains static. This technique is called coherent optical detection below.

The document "Polarization-independent receivers for low-cost coherent OOK systems" by Ernesto Ciaramella, Photonics Technology Letters, Vol 26, No 6, published Mar. 15, 2014, describes a system providing a solution. This communication system, which is for an optical network, comprises: a light-wave circuit comprising single-mode and multimode optical fibers, and an optical-fiber coupler to form a 3×3 optical combiner with input and output single-mode fibers.

The operating principle of the prior art is based on two set-ups (illustrated by FIGS. 2 and 3, respectively) that allow coherent optical detection, which is based on mixing the received signal with a second optical wave called the "local oscillator" wave, followed by detection by photo-detectors. This optical wave (also called the beat signal, or oscillation signal), which is generated locally in the receiver, is output by the local oscillator (LO), which is so called by analogy with the radio field. The advantage in terms of sensitivity with respect to direct detection of the signal on a photo-detector is explained by the fact that the power of the detected electrical signal is multiplied by a factor depending on the optical power of the oscillation signal, while the noise inherent to the photo-detector remains unchanged. It will be noted that the optical community calls "mixing" the addition to the received signal of the signal from the local oscillator on a photo-detector.

One of the problems of the coherent receivers described above is that it is necessary to control the optical polarization of the input signal to guarantee the condition of coherency of the two waves, i.e. of the received signal and oscillation signal. Specifically, the signal resulting from the multiplication of the optical signal by the oscillation signal depends on the respective optical polarizations of the two signals; it may for example disappear if they are orthogonal. It is therefore necessary to make sure the signals (the received signal and the oscillation signal) have parallel polarization axes. Given the random variation in the state of polarization (SOP) of the signal in the fiber, it is necessary to use, reception-end, an assembly compatible with polarization diversity. In practice, this may be achieved using a polarizing beamsplitter (PBS). The first variant of implementation of the mixer (MEL1, FIG. 2) proposes to split the oscillation signal (SLO) delivered via the optical fiber LOSOF into two orthogonal components in order to achieve mixing that is independent of the SOP of the signal. In the second variant of implementation of the mixer (MEL2, FIG. 3), the inverse principle is used, the payload signal (SPL) received via the optical fiber PLSOF being split into two orthogonal components (via the polarization splitter PBS) in order to achieve mixing with a polarized signal SLO. For mixing to take place on the basis of a single polarization axis, a polarization rotator PR makes one of the polarization axes of the splitter PBS undergo a rotation of 90°. In both variants, the three resulting signals are combined using the coupler C, which itself is connected to a coherent-detection device.

This technique has the drawback of requiring electronic post-processing, typically using a digital signal processor (DSP), following the coherent detection, in order to compensate for distortions of the received signal.

One of the aims of the invention is to remedy these drawbacks of the prior art.

3. DISCLOSURE OF THE INVENTION

The invention improves the situation using a device for coherent detection of data transported in an optical signal called the input payload signal, the device comprising:
  a first input single-mode optical fiber, which injects the input payload signal,
  a second input single-mode optical fiber, which injects an optical signal of optical frequency that is equal, substantially equal or very close to that of the input payload signal, called the oscillation signal,
  a signal mixer in which one of the signals of the first or of the second fiber is split into two signals of orthogonal polarizations, and in which the other of the signals of the first or of the second fiber is mixed with the two split signals, producing a mixed signal,
  a detector of said transported data present in the mixed signal,
  an amplitude modulator configured to modulate the oscillation signal before it enters the mixer, the modulation pattern comprising repetitive pulses of same interval as a symbol time of the input payload signal.

The signal mixer allows coherent detection of the data in the input payload signal, but difficulties arise due to the distortions undergone by the signal in its optical medium as well as in the mixer. It will be recalled that, in an optical data signal, the data are encoded on various parameters of the pure optical carrier, i.e. the optical wave without signal. These parameters may be the amplitude, the phase, the frequency and the polarization of the signal. The bit stream to be transported is divided into sequences. These sequences are themselves encoded in the form of "symbols", each symbol being a combination of the parameters listed above, and of constant duration.

In the simplest case, that of direct binary encoding, the data of the bit stream to be transported are encoded directly using a succession of low amplitudes and of high amplitudes of the light, corresponding to zeroes (0's) and ones (1's), respectively, these 0's and 1's being referred to as optical bits. Each symbol is in this case equivalent to one bit, and the expression "bit time" is sometimes used instead of "symbol time".

In other cases, 2 or more bits are encoded per symbol. For example, one possibility is to encode two bits per symbol using 4-level amplitude modulation. In this encoding scheme, which is called PAM-4 (PAM standing for pulse amplitude modulation; PAM-8 with 3 bits per symbol is also used), the bit stream to be transported is divided into chunks of 2 bits: if these two bits are "00", the optical signal will have a low amplitude; if these two bits are "11", the optical signal will have a high amplitude; if the two bits are "01" or "10", the signal will take one of two amplitude values intermediate between the high amplitude and the low amplitude.

Another possibility is also to encode the bits on a plurality of amplitude levels, as with PAM-4 or natural binary, while also shifting the phase of the carrier with respect to the other symbols or with respect to a reference: reference is then made to quadrature amplitude modulation (QAM). There are many other modulation schemes to which the invention described here applies, such as OOK (NRZ, RZ, Miller, Manchester, etc.), PAM-n, n-QAM, etc.

It will also be recalled that an optical oscillation signal according to the prior art has a continuous optical amplitude. By virtue of the amplitude modulator applied to the optical oscillation signal, the distortions undergone by the signal are compensated for by an accentuation of the rising and falling edges of the optical symbols in the signal. The boundary between the optical symbols is therefore more marked, and the coherent-detection device makes fewer detection errors.

According to one aspect of the coherent-detection device, the value of the symbol time of the payload signal is delivered by a clock recoverer connected to the detector.

Thus, the frequency of the oscillation pattern corresponds in real time to the actual frequency of the symbols of the signal, as the symbols are detected. The value delivered by the clock recoverer may be the frequency of the symbols, and not the value of the interval between symbols. In this case, it is easy to deduce the latter (i.e. the value of the interval between symbols) from the former (i.e. the frequency of the symbols).

The recovery of a clock signal generally occurs at the same time as the recovery of the data, and is known by the acronym CDR (standing for clock and data recovery). A CDR module contains a clock-recovery circuit and a decision circuit. The extraction and the processing of the clock signal are carried out on the basis of the received signal. The clock-recovery circuit is therefore located downstream of the optoelectronic reception.

A CDR module has two main functions: extracting the frequency of the signal and aligning to the same temporal phase. The extraction process consists in obtaining a clock signal of same frequency as that of the data resulting from the photo-detection. The alignment in time consists in adjusting the clock phase so that the data signal is sampled at the optimum time by the decision circuit.

According to one aspect of the coherent-detection device, the temporal-phase alignment between the pattern of the oscillation signal and the input payload signal is adjusted by a clock- and phase-recovery circuit comprising the following elements:

the clock recoverer, which is connected to the detector and configured to compute a value of the symbol time of the payload signal depending on the detected data, a performance computer configured to compute a performance level of the detected signal, on the basis of the detected data, a pattern generator, which is connected to the clock recoverer and configured to generate a modulation pattern of the oscillation signal on the basis of the value of the symbol time of the payload signal, a temporal-phase aligner, which is connected to the computer and to the pattern generator, and configured to determine an alignment of the modulation pattern in time that maximizes the performance level of the detected signal.

The alignment of the modulation pattern with the payload signal is not necessarily the same as that used by the clock recoverer to extract the data from the payload signal, even if the frequency is the same. By virtue of the clock- and phase-recovery circuit described above, an optimal alignment will be determined for the modulation pattern depending on a performance criterion. This performance criterion is impacted by the alignment.

According to one aspect of the coherent-detection device, the symbols are encoded on 1 bit and the performance level computed by the performance computer is a function of a bit error rate.

The alignment of the modulation pattern is determined to be satisfactory when the bit error rate is lower than or equal to a threshold. This threshold is a bit error rate, for example $10^{-12}$, beyond which a degradation in the quality of the service delivered via the payload data of the optical signal is no longer perceptible. Other values for the threshold may be envisioned. For a G-PON for example, the maximum error rate permitted by the standard is $10^{-10}$. For an XGS-PON, it is $10^{-3}$ before application of an error correction code and $10^{-12}$ afterwards.

According to one aspect of the coherent-detection device, the symbols are encoded on 2 or more bits, and the performance level computed by the performance computer is a value representative of a quality of a constellation of symbols in the detected signal.

According to one aspect of the coherent-detection device, the symbols are encoded on 2 or more bits, and the performance level computed by the performance computer is a value representative of a quality of an eye diagram produced on the basis of the signal detected.

According to one aspect of the coherent-detection device, the performance level computed by the performance computer is a value representative of a signal-to-noise ratio of the detected signal.

According to one aspect of the coherent-detection device, the temporal-phase aligner comprises a finite impulse response filter.

According to one aspect of the coherent-detection device, a single weighting coefficient of the finite impulse response filter is non-zero.

According to one aspect of the coherent-detection device, the pattern generator is connected to the performance computer, and selects, for the modulation pattern, a pulse shape that maximizes the performance level.

Thus, not only is the modulation pattern optimally aligned, but the type of pattern used is also optimal for the detection of the data transported by the input payload signal.

According to one aspect of the coherent-detection device, the repetitive pulses of the modulation pattern have a peak shape in proximity to the limit between each symbol time of the payload signal.

According to one aspect of the coherent-detection device, the repetitive pulses of the modulation pattern have a valley shape in proximity to the limit between each symbol time of the payload signal.

By virtue of this aspect, the optical levels of the input signal that correspond to 1's or 0's are more easily discriminated between. The possible types of pulse shapes are a peak, a valley, or a combination of a peak and valley.

The various aspects of the coherent-detection device that have just been described with respect to this first embodiment may be implemented independently of one another or in combination with one another.

The invention also relates to a method for coherent detection of data transported in an optical signal called the input payload signal, comprising:

modulating an optical signal of optical frequency substantially equal to that of the input payload signal, which signal is called the oscillation signal, with a modulation pattern comprising repetitive pulses of same interval as the symbol time of the input payload signal, mixing the input payload signal and the modulated oscillation signal, one of the two signals being split into two signals of orthogonal polarizations, and the other of the two signals being mixed with the two split signals, producing a mixed signal, detecting said data transported in the mixed signal, using a detector.

According to one of its aspects, the coherent-detection method further comprises:

recovering a value of the symbol time of the payload signal depending on the detected data, using a clock recoverer connected to the detector, computing a performance level of the detected signal, on the basis of the detected data, determining (E4) a temporal-phase alignment of the modulation pattern that maximizes the performance level.

According to one of its aspects, the coherent-detection method further comprises:

comparing the performance level to a first threshold, and if the first threshold is not reached, modifying the temporal-phase alignment of the modulation pattern by shifting it in one direction or the other.

The magnitude of the shift, which may be made alternately in each direction, may decrease as the optimum alignment is sought.

According to one aspect of the coherent-detection method, modifying the temporal-phase alignment of the modulation pattern consists in changing the single non-zero weighting coefficient in a finite impulse response filter applied to the oscillation signal.

According to one of its aspects, the coherent-detection method further comprises:

comparing the performance level to a second threshold, and if the second threshold is not reached, modifying the modulation pattern of the oscillation signal.

This method is intended to be implemented in all the embodiments of the coherent-detection device that has just been described.

In a first embodiment of the coherent-detection device, each symbol is encoded on one bit and the symbol time is equivalent to the bit time.

In a second embodiment of the coherent-detection device, each symbol is encoded on two or more bits, and the expression used is "symbol time".

4. PRESENTATION OF THE FIGURES

Other advantages and features of the invention will become more clearly apparent on reading the following description of one particular embodiment of the invention, which embodiment is given by way of simple illustrative and non-limiting example, and the appended drawings, in which.

5. DETAILED DESCRIPTION OF AT LEAST ONE EMBODIMENT OF THE INVENTION

Figure 2:
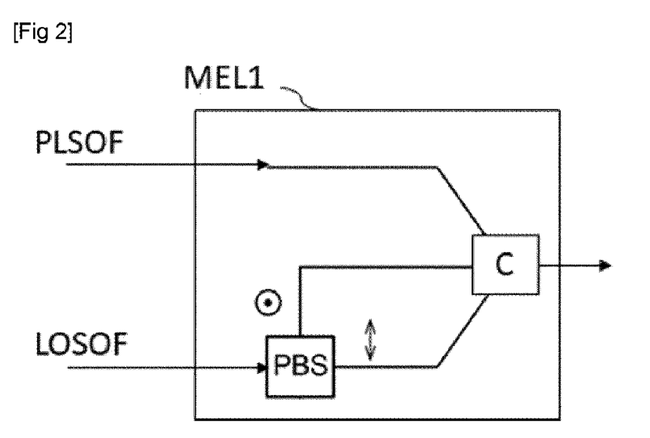
FIG. 2 schematically shows a first example of a signal mixer for a device for coherent detection of data in an optical signal received on a single-mode optical fiber, according to the prior art, FIG. 3 schematically shows a second example of a signal mixer for a device for coherent detection of data in an optical signal received on a single-mode optical fiber, according to the prior art, FIG. 4 schematically shows one example of a modulation pattern of the oscillation signal.
Figure 3:
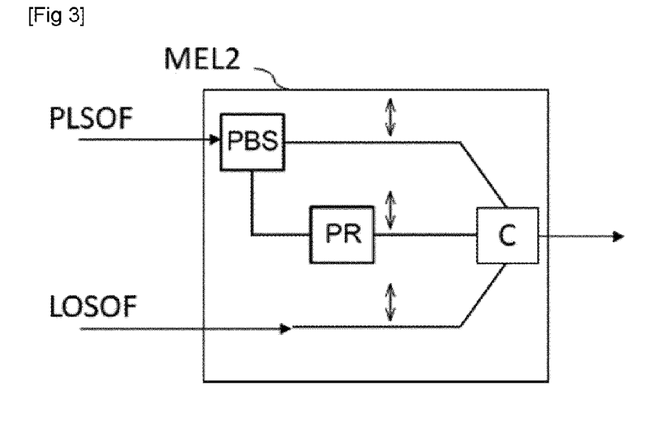

The principle of operation of a prior-art signal mixer for a device for coherent detection of data in an optical signal received via a single-mode optical fiber was presented above, with reference to FIGS. 2 and 3, which will not be described again.

Figure 1:
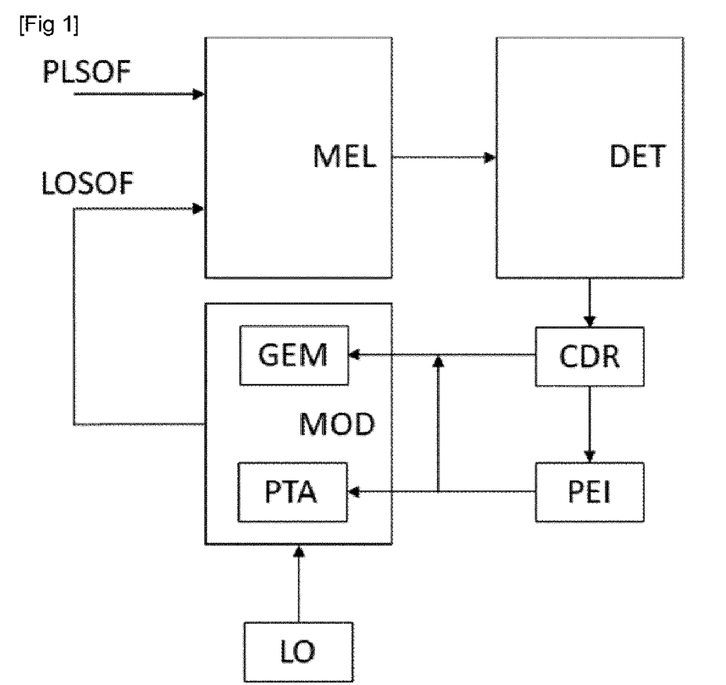
FIG. 1 schematically shows one example of a device for coherent detection of data in an optical signal received on a single-mode optical fiber, according to one aspect of the invention.

FIG. 1 schematically shows one example of a device for coherent detection of data in an optical signal received on a single-mode optical fiber, according to one aspect of the invention.

Figure 4:
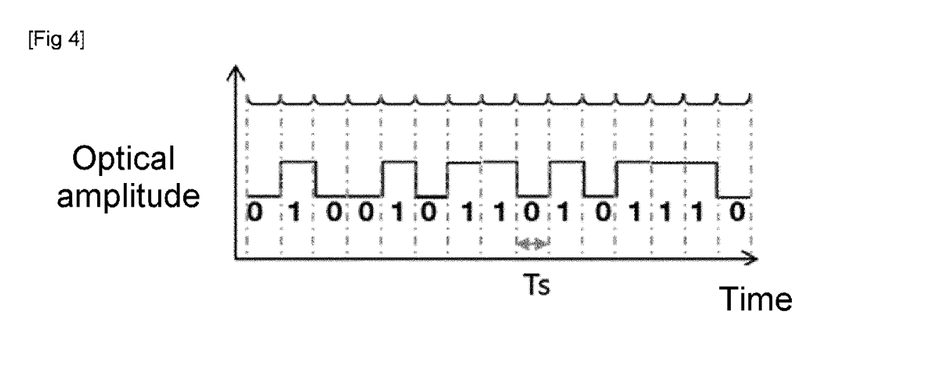
Figure 5:
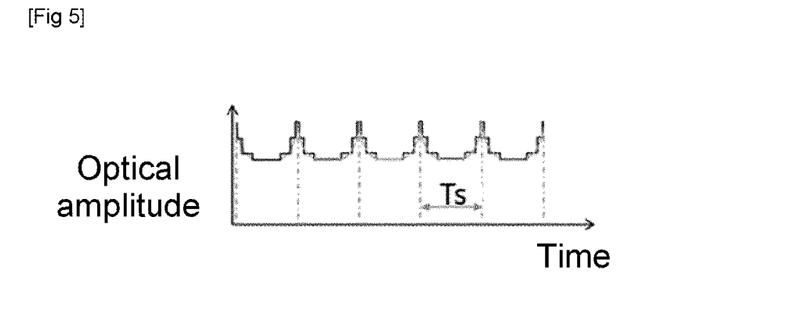
FIG. 5 shows a first exemplary shape for the modulation pattern of the oscillation signal.
Figure 6:
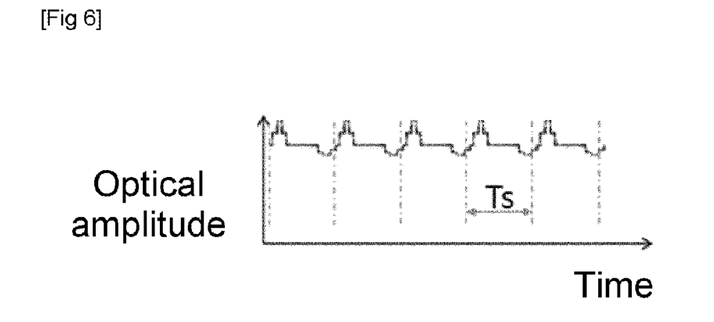
FIG. 6 shows a second exemplary shape for the modulation pattern of the oscillation signal.

The invention proposes to modulate a local oscillator LO in order to correct the distortion of the received signal. An optical local oscillator, in the prior art, has an optical amplitude that is continuous over time. According to the invention, a modulator MOD modulates the optical source of the local oscillator LO, which may or may not itself be comprised in the detection device according to the invention, using a repetitive modulation pattern that repeats at the frequency of the symbol time (denoted Ts) of the signal, for example such as the pattern illustrated in FIG. 4. This repetitive modulation pattern may be analog or digital and have various shape and amplitude characteristics, as shown in FIGS. 5 and 6. The pattern of FIG. 5 comprises a peak at the boundary of the symbol time, whereas the pattern of FIG. 6 comprises a valley immediately before the symbol time, followed by a peak immediately after.

Figure 7:
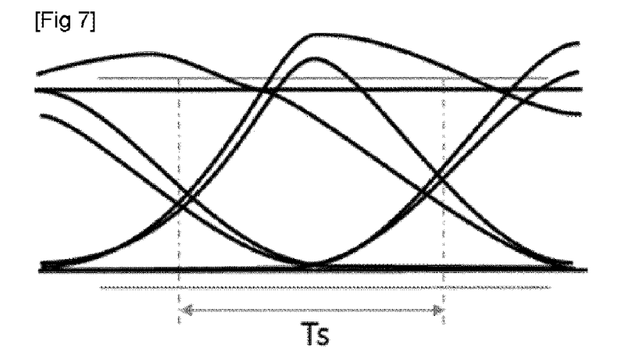
FIG. 7 shows a schematic view of a distorted signal before modulation of the oscillation signal.
Figure 8:
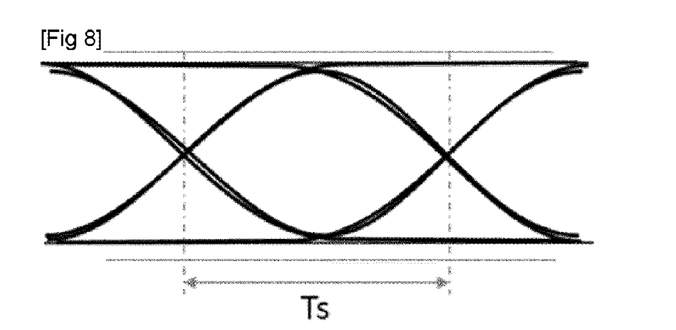
FIG. 8 shows a schematic view of an improved signal after modulation of the oscillation signal.

The objective of this repetitive modulation pattern is to correct distortions of the signal such as for example that shown by the eye diagram of FIG. 7, in order to get closer to that of FIG. 8.

This repetitive modulation pattern of the local oscillator must be of the same frequency as the symbol time of the signal. This pattern must also be aligned in time so that the start of the pattern corresponds to the start of one bit of the signal.

The clock recoverer CDR and the computer PEI of the performance of the detected signal allow the symbol time Ts and temporal phase of the signal to be recovered, with a view to parameterizing the repetitive modulation pattern.

The procedure used to recover the clock signals and data is known by the acronym "CDR" (which stands for clock and data recovery). The recoverer CDR contains a clock-recovery circuit and a decision circuit. The extraction and the processing of the clock signal are carried out on the basis of the received signal. The clock-recovery circuit is located after the optoelectronic detector DET and has two main functions: extracting the frequency of the signal and aligning to the same temporal phase. The extraction process consists in obtaining a clock signal of same frequency as that of the data resulting from the photo-detection carried out by the detector DET. The alignment in time consists in adjusting the clock phase so that the data signal is sampled at the optimum time by the decision circuit.

A plurality of architectures of the clock-recovery circuit have been proposed in various technologies and for various fields of application. In most cases, these are circuits using the principle of phase-locked loop or PLL. The PLL allows both the frequency to be extracted and the phase to be synchronized by virtue of a control loop. In this way, a variable-frequency local oscillator generates a clock signal the phase of which is "locked" to that of the input data.

According to the invention, in order to obtain an optimal result, the repetitive electro-optical modulation pattern of the local optical oscillator must be of the same frequency as the symbol time of the signal, and also be in temporal phase with the symbol time of the signal. To this end, a block PTA (PTA standing for phase time alignment) allows the temporal phase of the pattern with respect to the received optical signal to be optimized according to a performance criterion.

One way of realizing the block PTA is using a finite impulse response filter, which makes it possible to control the relative phase shift between the payload signal and the oscillation signal. In a finite impulse response filter, the input electrical signal is sampled at a set period T. Each sample is weighted and added with the weighted samples of the adjacent times, the latter samples being delayed by a relative integer number of periods T with respect to the input signal. It is thus possible to create a tailor-made impulse response, within the limits of the memory of the equipment, i.e. the maximum number of samples that may be stored, of the sampling period T, and of the precision of the weighting coefficients. These coefficients influence the temporal alignment of the produced signal and must be chosen to maximize a performance indicator. This performance criterion is provided by the block PEI.

When all the coefficients of the impulse response are zero except one, the delay applied by the filter to the input signal is a multiple of the sampling period T.

It is therefore possible, by virtue of this aspect, to delay the input signal by zero, one times T, two times T, and so on up to $(N-1)*T$, where N is the number of coefficients of the filter.

If the only non-zero coefficient is the coefficient that does not apply any delay with respect to the signal input into the filter before being sent to the adder unit used to add the payload and oscillation signals, then the output signal is the same as that input, without delay. Specifically, the adder does not receive any other signal: the impulse response is a pseudo-Dirac, this indicating an absence of filtering. If the only non-zero coefficient is the one applying a delay equal to a period T with respect to the signal input before being sent to the adder unit, then the oscillation signal output from the filter is the same as that input, except that it is delayed by a time T. And so on, this making it possible to obtain a programmable delay line.

For example, a finite impulse response filter with 9 coefficients and a sampling period T equal to 18 ms gives a choice between 9 regularly spaced delays between 0 and 144 ms (8 times 18 ms). Such a filter is suitable for a symbol time Ts of 144 ms maximum.

In a first embodiment, the symbol is equal to one bit, and may therefore take one of two values 0 and 1. The performance computer PEI may in this case be based on the bit error rate (BER).

This repetitive modulation pattern of the local oscillator is generated by the block GEM, which may modify it to optimize the equalization of the signal. Two examples of patterns are illustrated in FIGS. 5 and 6, but other patterns may be obtained by combining peaks and valleys in different ways in proximity to the boundary of a symbol time, and using various peak and/or valley amplitudes. To optimize the equalization of the signal, it is also possible to compare one or more sequences of training symbols with the recovered data output from the detector DET, while varying the repetitive pattern.

Figure 9:
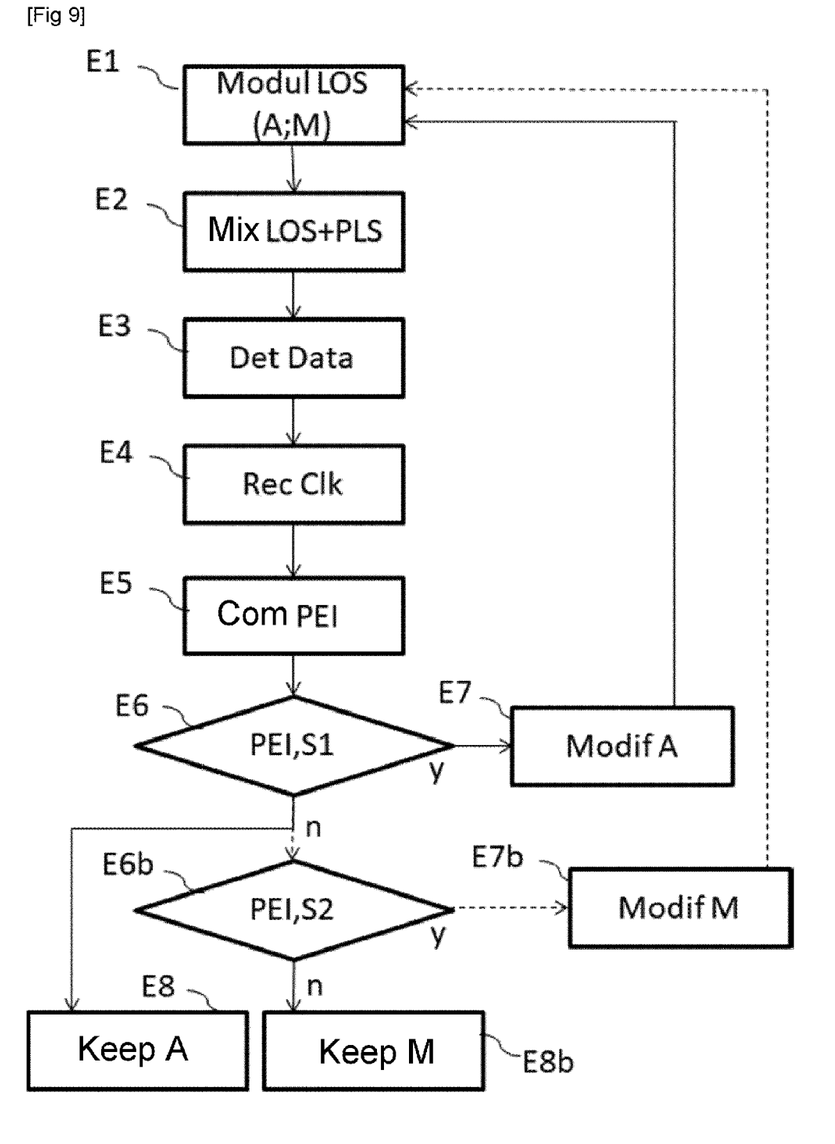
FIG. 9 schematically shows one example of a method for coherent detection of data in an optical signal received on a single-mode optical fiber, according to one aspect of the invention.

FIG. 9 schematically shows one example of a method for coherent detection of data in an optical signal received on a single-mode optical fiber, according to one aspect of the invention.

In a step E1, the optical oscillation signal LOS is modulated with a pattern M and a temporal-phase alignment A.

In a step E2, the modulated oscillation signal, transported by the optical fiber LOSOF, and the payload optical signal PLS transported by the optical fiber PLSOF, are mixed, using a mixer such as those described with reference to FIGS. 2 and 3.

In a step E3, the one or more signals resulting from the mixing are projected, for example, onto one or more photodiodes, which detect the payload data transported in the signal PLS.

In a step E4, the clock of the signal PLS is recovered, for example in the way described above. By clock recovery, what must be understood is recovery both of the value of the symbol time and of the temporal-phase alignment between the symbols in the signal PLS and this clock.

In a step E5, a bit error rate is computed from the recovered clock. This error rate may be computed from sequences of known symbols or from an error counter included in a coding technique based on redundancy (also called an error correction code).

In a step E6, the bit error rate is compared to a threshold S1, for example $10^{-12}$. If it is lower than the threshold S1, this means that the alignment A is satisfactory and may be kept (step E8). It is however advantageous to repeat the test of step E6, should the signals PLS and/or LOS drift over time.

If it is higher than or equal to the threshold S1, the alignment A is modified in a step E7. The method then returns to step E1, with the alignment A modified. It will be understood that the method stabilizes when a value of the alignment A is found that results in a bit error rate lower than the threshold S1.

It is possible to use the shape of the modulation pattern M as an adjustment variable, instead of or in addition to the alignment A of the temporal phase of the repetitive modulation pattern of the oscillation signal.

In a first variant of this embodiment, even if the bit error rate is lower than the threshold S1, it is also compared to a second threshold S2, lower than S1, in a step E6b.

If it is lower than the threshold S2, this means that the pattern M is satisfactory and may be kept (step E8b). It is however advantageous to repeat the test of step E6b, should the signals PLS and/or LOS drift over time.

If it is higher than or equal to the threshold S2, the pattern M is modified in a step E7b.

A selection is made from a plurality of pattern shapes, and for example from the shapes illustrated in FIGS. 5 and 6. The method then returns to step E1, with the pattern M modified. It will be understood that the method stabilizes when a shape for the pattern M is found that results in a bit error rate lower than the threshold S2.

In this first variant, the main adjustment variable is the alignment A, but the shape of the pattern M is an additional adjustment variable making it possible to further improve the bit error rate.

In a second variant of this embodiment, only the test of step E6b is performed, followed by step E7b or E8b. The only adjustment variable is then the shape of the repetitive modulation pattern of the oscillation signal.

In a third variant of this embodiment, the test of the threshold S2 associated with the pattern M is carried out before the test of the threshold S1 associated with the alignment A (the order of steps E6 and E6b is inverted), and it is the threshold S1 that is lower than the threshold S2. The main adjustment variable is then the shape of the pattern M, but the alignment A is also an adjustment variable making it possible to further improve the bit error rate.

In a fourth variant of this embodiment, the steps E6 and E6b are performed in parallel, and the threshold S1 may be lower than, equal to or higher than the threshold S2. The alignment A and the shape of the pattern M are then independent adjustment variables making it possible to improve the bit error rate.

In a second embodiment of the invention, each symbol may be encoded on two or more bits.

It will be recalled that, according to the invention, in order to obtain an optimal result, the repetitive electro-optical modulation pattern of the local optical oscillator must be of the same period as the symbol time of the signal, and be in temporal phase with the symbol time of the signal. To this end, the block PTA allows the temporal phase of the pattern with respect to the received optical signal to be optimized according to a performance criterion that may not be based on the binary error rate BER, but rather on a different performance criterion, provided by the block PEI.

Specifically, when the symbols of the payload signal are each encoded on more than one bit, the bit error rate is no longer an appropriate performance indicator. A plurality of indicators are possible, such as:

a value representative of a quality of a constellation of symbols in the detected signal, which quality is for example measured by a signal analyzer. This embodiment of the PEI is particularly suitable when the data are encoded by the phase of the symbol in addition to its amplitude, in the case of quadrature amplitude modulation (QAM) in particular. The signal analyzer samples the analog signal in order to extract therefrom the symbol phase and amplitude information. It is also capable of giving an indication as to the quality of the signal, by estimating the phase and amplitude deviation with respect to phase and amplitude values expected for the symbol in question. This measurement does not require a sequence of symbols known in advance to be sent;

a value representative of a quality of an eye diagram (examples of which are illustrated in FIGS. 7 and 8) produced from the detected signal, which value is for example measured by an oscilloscope. To produce the eye diagram, the oscilloscope will superpose the temporal traces of the transmitted symbols. This superposition will emphasize the distortions undergone by the signal: intensity noise, jitter, distortions of rising and falling edges, etc. An open eye will be the sign of a good quality signal. This embodiment does not give information on the phase of the signal, only on its amplitude: it may be used for all types of modulation using amplitude modulation alone, or amplitude and phase modulation (QAM for example). However, in the latter case, it will not be possible to extract information on the degradation of the phase;

a value representative of a quality of the signal-to-noise ratio measured in a time range on the basis of the detected signal, which value is for example measured by a signal analyzer. The quality of the signal-to-noise ratio will be generic to the signal over the time of the measurement, and will not discriminate between the various symbols, contrary to the value of the quality of a constellation of symbols.

With reference to FIG. 9, the second embodiment of the invention impacts certain steps of the proposed method.

In this second mode, the performance indicator used by way of example is the eye diagram, but others are possible.

In a modified step E5, the quality of an eye diagram is computed by the block PEI, on the basis of the recovered clock.

In a modified step E6, the quality of an eye diagram is compared to a threshold S1 specific to the indicator used, here the eye diagram. Comparison methods using thresholds, applicable to the eye diagram, are known to those skilled in the art and are not explained here.

If it is higher than or equal to the threshold S1, this means that the alignment A is satisfactory and may be kept (step E8). It is however advantageous to repeat the test of step E6, should the signals PLS and/or LOS drift over time.

If it is lower than the threshold S1, the alignment A is modified in step E7, for example by changing the non-zero coefficient in the finite impulse response filter of the block PTA. The method then returns to step E1, with the alignment A modified. It will be understood that the method stabilizes when a non-zero coefficient of the finite impulse response filter is found that results in an eye-diagram quality higher than the threshold S1.

In variants of this embodiment that are similar to those presented with reference to the first embodiment, an additional adjustment variable is the shape of the pattern M used to modulate the oscillation signal. In a modified step E6b, the eye-diagram quality computed in step E5 is also compared to another threshold S2 that may be different from S1, to determine whether the shape of the pattern M is satisfactory or must be changed. In a third embodiment of the invention, the first two embodiments that have just been described are executed one after the other. Specifically, when the symbol is encoded on a plurality of bits, an even higher result may be achieved by combining the first and second embodiments of the invention. Initially, coherent detection is carried out symbolwise, according to the second embodiment, for example in order to detect the preamble of each data packet. Subsequently, the coherent detection is refined bitwise, according to the first embodiment.

The examples of embodiment of the invention that have just been described are merely a few of the envisionable embodiments. They show that the invention allows the coherent detection of data in an optical signal to be improved using an oscillation signal with pulses that are adjustable in terms of shape and in terms of temporal-phase alignment.

The invention claimed is:

1. A device for coherent detection of data transported in an optical signal called an input payload signal, the device comprising:
    a first input single-mode optical fiber, which injects the input payload signal,
    a second input single-mode optical fiber, which injects an optical signal of optical frequency substantially equal to that of the input payload signal, called an oscillation signal,
    a signal mixer in which one of the signals of the first or of the second fiber is split into two signals of orthogonal polarizations, and in which the other of the signals of the first or of the second fiber is mixed with the two split signals, producing a mixed signal,
    a detector of said transported data present in the mixed signal,
    an amplitude modulator configured to modulate the oscillation signal before the oscillation signal enters the mixer, the amplitude modulator having a modulation pattern comprising repetitive pulses of same interval as a symbol time of the input payload signal, and
    a circuit, which is configured to adjust a temporal-phase alignment between the pattern of the oscillation signal and the input payload signal, the circuit comprising:
        a clock recoverer, which is connected to the detector and configured to compute a value of the symbol time of the input payload signal depending on the detected transport data, and deliver the value of the symbol time to the amplitude modulator,
        a performance computer configured to compute a performance level of the mixed signal, on the basis of the detected transport data,
        a pattern generator, which is connected to the clock recoverer and configured to generate the modulation pattern of the oscillation signal on the basis of the value of the symbol time of the input payload signal,
        a temporal-phase aligner, which is connected to the performance computer and to the pattern generator, and configured to determine an alignment of the modulation pattern in time that maximizes the performance level of the mixed signal.

2. The device for coherent detection as claimed in claim 1, wherein the symbols are encoded on 1 bit and wherein the performance level computed by the performance computer is a function of a bit error rate.

3. The device for coherent detection as claimed in claim 1, wherein the symbols are encoded on 2 or more bits, and wherein the performance level computed by the performance computer is a value representative of a quality of a constellation of symbols in the mixed signal.

4. The device for coherent detection as claimed in claim 1, wherein the symbols are encoded on 2 or more bits, and wherein the performance level computed by the performance computer is a value representative of a quality of an eye diagram produced on the basis of the mixed signal.

5. The device for coherent detection as claimed in claim 1, wherein the performance level computed by the performance computer is a value representative of a signal-to-noise ratio of the mixed signal.

6. The device for coherent detection as claimed in claim 1, wherein the temporal-phase aligner comprises a finite impulse response filter.

7. The device for coherent detection as claimed in claim 6, wherein a single weighting coefficient of the finite impulse response filter is non-zero.

8. The device for coherent detection as claimed in claim 1, wherein the pattern generator is connected to the computer, and selects, for the modulation pattern, a pulse shape that maximizes the performance level.

9. The device for coherent detection as claimed in claim 1, wherein the repetitive pulses of the modulation pattern have a peak shape at a boundary between each symbol time of the payload signal.

10. The device for coherent detection as claimed in claim 1, wherein the repetitive pulses of the modulation pattern have a valley shape immediately before a boundary between each symbol time of the payload signal.

11. A method for coherent detection of data transported in an optical signal called the input payload signal, the method being implemented by a device and comprising:
    modulating an optical signal of optical frequency substantially equal to that of the input payload signal, which called an oscillation signal, with a modulation pattern comprising repetitive pulses of same interval as a symbol time of the input payload signal,
    mixing the input payload signal and the modulated oscillation signal, one of the two signals being split into two signals of orthogonal polarizations, and the other of the two signals being mixed with the two split signals, producing a mixed signal, and
    detecting said data transported in the mixed signal, using a detector,
    recovering a value of the symbol time of the payload signal depending on the detected transport data, using a clock recoverer connected to the detector,
    computing a performance level of the mixed signal, on the basis of the detected transport data, and
    determining a temporal-phase alignment of the modulation pattern that maximizes the performance level,
    comparing the performance level to a first threshold, and in response to the first threshold being not reached, modifying the temporal-phase alignment of the modulation pattern by shifting the temporal-phase alignment in a first direction or in a second direction,
    wherein modifying the temporal-phase alignment of the modulation pattern comprises changing the single non-zero weighting coefficient in a finite impulse response filter applied to the oscillation signal.

12. The coherent-detection method as claimed in claim 11, further comprising:
    comparing the performance level to a second threshold, and if the second threshold is not reached, modifying a shape of the modulation pattern of the oscillation signal.

* * * * *